United States Patent
Kalker

(10) Patent No.: US 6,662,075 B2
(45) Date of Patent: Dec. 9, 2003

(54) LOAD-ADAPTIVE CONTROL SYSTEM, IN PARTICULAR FOR TRANSPORT DEVICES AND USED IN AIRCRAFT

(75) Inventor: Thomas Kalker, Igersheim (DE)

(73) Assignee: Wittenstein GmbH & Co. KG, Igersheim (DE)

( * ) Notice: Subject to any disclaimer, the term of this patent is extended or adjusted under 35 U.S.C. 154(b) by 198 days.

(21) Appl. No.: 09/943,328

(22) Filed: Aug. 29, 2001

(65) Prior Publication Data

US 2002/0045972 A1 Apr. 18, 2002

(30) Foreign Application Priority Data

Sep. 1, 2000 (DE) .......................... 100 43 020

(51) Int. Cl.$^7$ ............................... G06F 7/00
(52) U.S. Cl. ..................................... 700/213
(58) Field of Search .......................... 700/213

(56) References Cited

U.S. PATENT DOCUMENTS 4,242,622 A * 12/1980 Shepard, Jr. ............. 318/616
4,323,134 A * 4/1982 Gray ...................... 180/176
5,209,110 A * 5/1993 Sano et al. ............... 73/118.1
5,402,879 A * 4/1995 Briehl ...................... 198/832
5,602,708 A * 2/1997 Felgenhauer ............... 361/51

* cited by examiner

Primary Examiner—Khoi H. Tran
(74) Attorney, Agent, or Firm—Bachman & LaPointe, P.C.

(57) ABSTRACT

The invention relates to a monitoring unit (5) for monitoring a first control value ($I_{nom}$) for overshooting or undershooting of a threshold value ($I_{max}$), with the first control value ($I_{nom}$) being used for controlling an apparatus (3). The monitoring unit (5) in this case has determination means (10, 20, 30, 40, 45) for determining the threshold value ($I_{max}$) from an instantaneous value ($I_s$) of the first control value ($I_{nom}$) when the apparatus (3) reaches a predetermined operating state, and monitoring means (50, 60) for monitoring the first control value ($I_{nom}$) for overshooting or undershooting of the determined threshold value ($I_{max}$) after the apparatus (3) has reached the predetermined operating state.

11 Claims, 5 Drawing Sheets

LOAD-ADAPTIVE CONTROL SYSTEM, IN PARTICULAR FOR TRANSPORT DEVICES AND USED IN AIRCRAFT

BACKGROUND OF THE INVENTION

The present invention relates to a control system, in particular for transport devices as used in aircraft.

Conveyor belts without closed-loop control are generally used for loading aircraft and initially have items of cargo placed on them, across their width, while they are stationary. Typically, once the entire width of the conveyor belt has been completely filled, the conveyor belt is moved onward, so that the load located on the conveyor belt is moved further to the rear into the aircraft.

In loading systems such as these, the loading process is thus broken down into two repeatedly recurring steps, namely a first loading step, in which the load is placed on the belt while it is stationary, and a second conveying step, in which the loaded belt is moved onward. The aircraft can in this way be filled layer by layer by the repeated sequence. Since the total load is increased with each loading step, the load being conveyed also increases in a corresponding manner with each conveying step.

Typically, the first loading steps present no problems for the entire loading process since in this case, firstly, there is still little load to be moved and, secondly, the load is also generally still largely located in the field of view of the load handler. Any sliding of the load, possibly resulting in the conveyor belt being blocked to a greater or lesser extent, can in general still be identified well during these first loading steps. Furthermore, the power of the motor driving the conveyor belt is typically also dimensioned such that, when the conveyor belt is only partially loaded, slight jamming or sliding of the load does not yet actually lead to the conveyor belt becoming totally blocked.

However, it can readily be seen that, as the loading process increases, and the load to be moved as well as the distance of the load from the point where the load is placed on the belt increase, the probability of faults rises, for example due to individual items of cargo sliding or becoming jammed. This can lead to the conveyor belt becoming completely blocked even before it has been completely filled which, particularly in time-critical situations such as when loading and unloading aircraft, can lead to undesirable and possibly costly time delays before the fault is identified and has been rectified. Furthermore, the blocking of individual items of cargo, even when this does not lead to a total blockage, can lead to power surges, which last for greater or lesser times, on the conveyor belt motor, which can in turn shorten the maintenance intervals for the conveyor system, and can reduce its life, in the long term.

While three-phase motors without closed-loop control are generally used at the moment for conveyor belt systems for loading aircraft, FIG. 1 shows a servo drive system with closed-loop control. A regulator 1 receives, as input variables, a nominal rotation speed $N_{nom}$ and a measured actual rotation speed N. The regulator 1 uses the difference between the actual rotation speed N and the nominal rotation speed $N_{nom}$ to define a current value $I_{nom}$ which corresponds essentially to a torque level that is to be set. The regulator 1 passes the current value $I_{nom}$ to an amplifier 2, which in turn acts on an actuator (or motor) 3. The actuator 3 operates a load 4. The actual rotation speed N is measured at the actuator 3, and is fed back to the regulator 1.

The servo drive system with closed-loop control shown in FIG. 1, in contrast to the drive system without closed-loop control, allows the torque of the actuator 3 to be readjusted if its rotation speed N does not match the nominal rotation speed $N_{nom}$. However, this arrangement has the problem of surges in the load 4, which, if there is a discrepancy between the actual rotation speed N and the nominal rotation speed $N_{nom}$, can lead to the power of the actuator 3 being increased, and can thus possibly excessively overload it.

Furthermore, malfunctions, for example due to blocking or jamming of items of cargo, are not identified and can thus further increase the load on the actuator 3.

The present invention is based on the object of providing an improved loading device which can also be used in particular for loading aircraft.

SUMMARY OF THE INVENTION

The present invention provides a monitoring unit for monitoring a first control value for overshooting or undershooting of a threshold value, which is used for controlling an apparatus. The monitoring unit in this case has determination means for determining the threshold value from an instantaneous value of the first control value when the apparatus reaches a predetermined operating state. Furthermore, the monitoring unit has monitoring means for monitoring the first control value for overshooting or undershooting of the determined threshold value after the apparatus has reached the predetermined operating state.

By determining the threshold value from the instantaneous value of the first control value when the apparatus reaches the predetermined operating state, the monitoring unit can carry out adaptive monitoring of the first control value, in each case matched to the conditions which also actually occur on reaching the predetermined operating state.

In one preferred embodiment, the determination means has a first identification means for monitoring an operating parameter of the apparatus for identification of the predetermined operating state of the apparatus. The identification means in this case uses the behavior of the operating parameter to deduce that the apparatus has reached the predetermined operating state.

The first identification means preferably has a comparator for comparing a predetermined value of the operating parameter with a modeled value of the operating parameter, in which case, if the values match, it is deduced that the apparatus has reached the predetermined operating state. The modeling of the values for the operating parameter in this case makes it possible to define and vary the reaching of the predetermined operating state irrespective of the actual conditions. This makes it possible, in particular, to reduce the influence of transient processes (for example with an overshoot and/or undershoot), which could incorrectly indicate that the predetermined operating state had been reached.

As an alternative to the model value, the comparator can also compare the predetermined value of the operating parameter with an actual value of the operating parameter. This makes it possible to define the reaching of the predetermined operating state as a function of the actual conditions.

The instantaneous value at the time when the predetermined operating state is reached is preferably stored. This stored value then represents the initial value for further monitoring of the first control value.

In a further embodiment, the determination means has a definition means for defining the threshold value from the instantaneous value of the first control value when the apparatus reaches the predetermined operating state, and from a permissible discrepancy. In this case, the permissible discrepancy may, for example, be a fixed value or may also be adaptively matched to the given conditions.

The monitoring means preferably has a second identification means for identifying whether the first control value is greater than or less than the determined threshold value.

The monitoring means preferably has a third identification means for identifying whether the first control value is greater than or less than the determined threshold value and whether the apparatus is in the predetermined operating state. In this way, the monitoring for overshooting or undershooting of the determined threshold value can be restricted to the time period after the apparatus has reached the predetermined operating state. A warning signal for the apparatus is preferably set when the determined threshold value is overshot or undershot.

The monitoring unit according to the invention is preferably used for a control system, for example for an actuator. The control system can in this case be used in particular for such transport devices, for example those in an aircraft, in which loading initially takes place in a stationary condition and the load is then transported further, as was described initially.

BRIEF DESCRIPTION OF THE DRAWINGS

Further advantages, features and details of the invention will become evident from the following description of preferred exemplary embodiments and from the drawings, in which.

DETAILED DESCRIPTION

Figure 1:
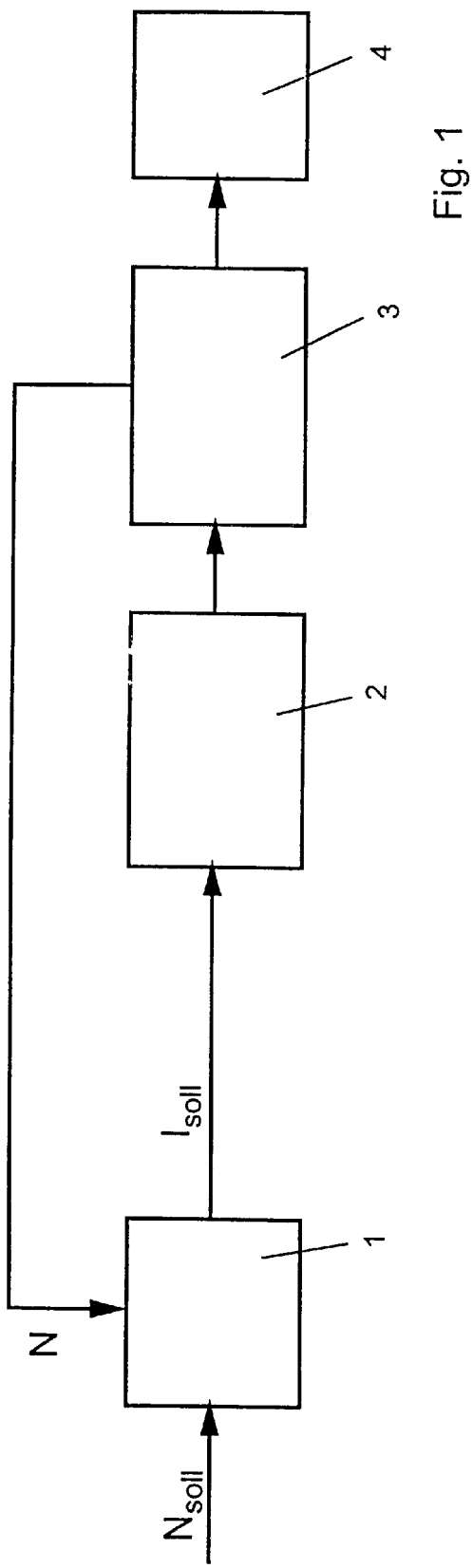
FIG. 1 shows a known servo drive system with closed loop control.
Figure 2:
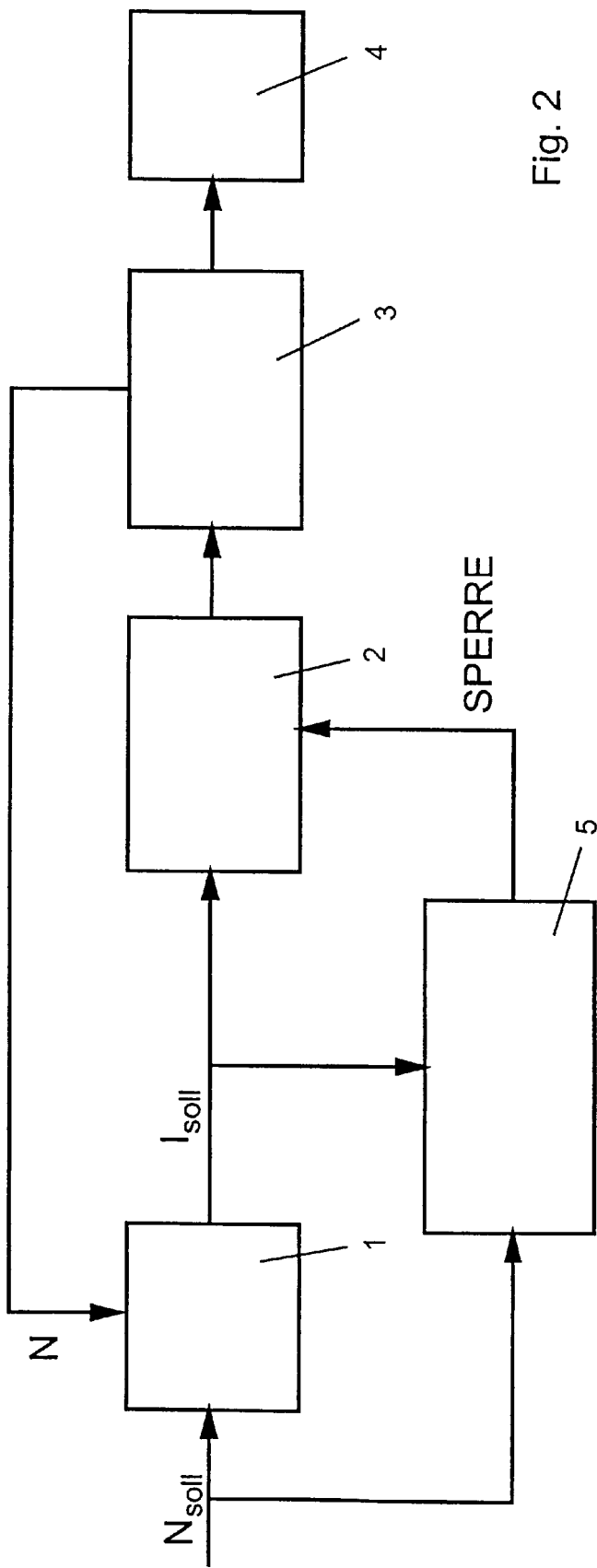
FIG. 2 shows a preferred embodiment according to the present invention.

FIG. 2 shows one preferred embodiment of the present invention for the example of a control system for a transport device, in particular in aircraft. In a corresponding way to the illustration in FIG. 1, the control system shown in FIG. 2 has the regulator 1, the amplifier 2 and the actuator 3, which in turn operates the load 4. The regulator 1 receives, as input variables, the nominal rotation speed $N_{nom}$ and the actual rotation speed N, and uses them to determine a control value for controlling the actuator 3. As the output from the regulator 1, this control value is preferably the current value $I_{nom}$, which is supplied via the amplifier 2 to the actuator 3, and which essentially corresponds to the torque to be set for the actuator 3. The actuator 3 feeds back the actual value N of its rotation speed to the regulator 1.

In contrast to the control system illustrated in FIG. 1, the control system shown in FIG. 2 also has a decision-maker 5 which receives, as input variables, the nominal rotation speed $N_{nom}$ and the output value from the regulator 1 (in this case the current value $I_{nom}$). An output "LOCK" from the decision-maker 5 acts on the amplifier 2 in order to lock the actuator 3 when necessary. In this context, the term "lock" can mean that the actuator 3 is entirely switched off or is just switched to produce no torque. In the latter case, the load 4 then brakes the actuator 3.

Figure 3:
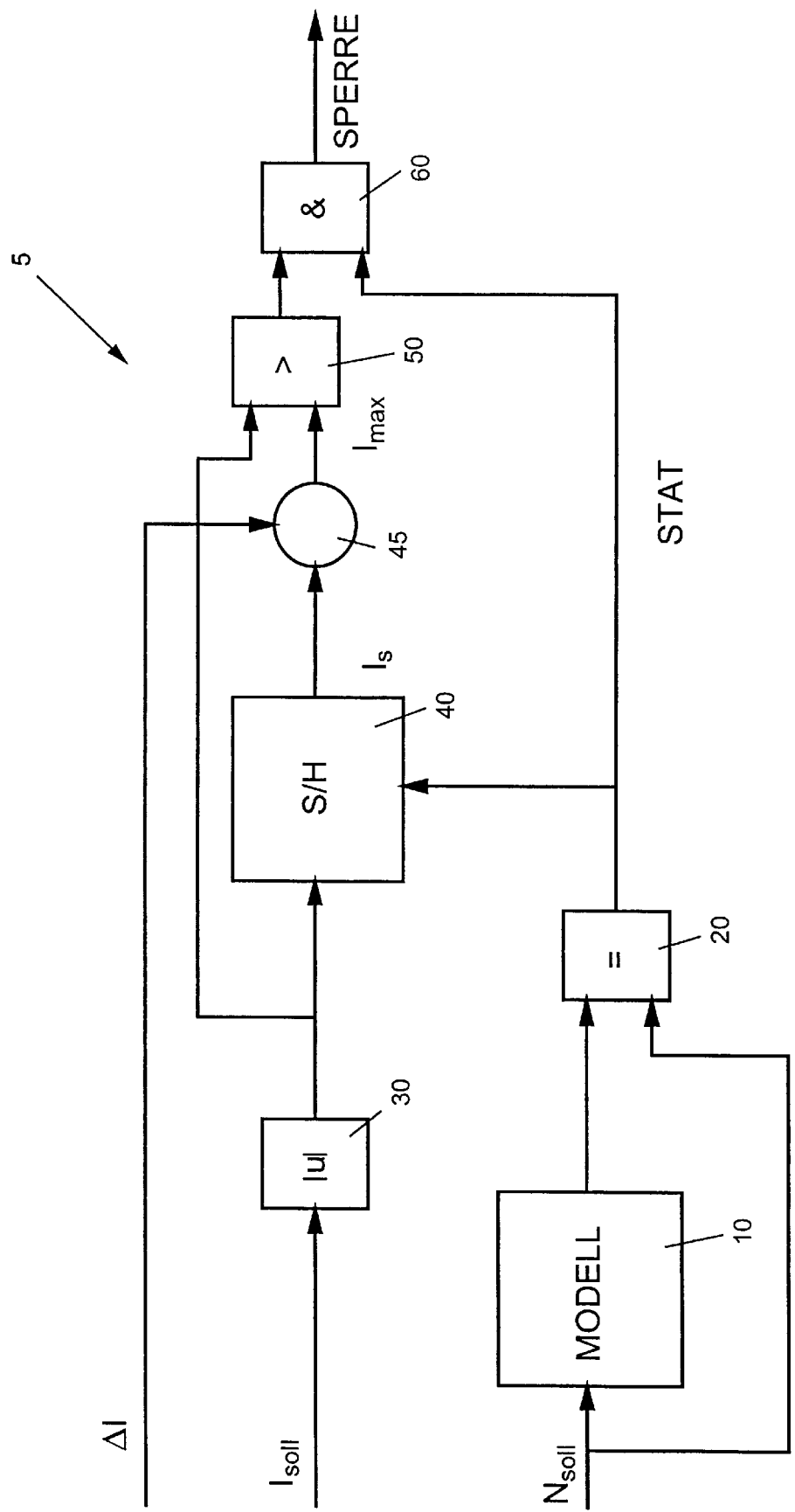
FIG. 3 shows a preferred exemplary embodiment of the decision-maker 5 from FIG. 2 in the form of a block diagram.

FIG. 3 shows a preferred exemplary embodiment of the decision-maker 5, in the form of a block diagram. The nominal rotation speed $N_{nom}$ acts on a model block 10, which produces a modeled rotation speed profile with respect to time, or has calculated such a profile, and passes this to its output. The output from the model block 10 and the nominal rotation speed $N_{nom}$ are supplied as input variables to a comparator 20. If the input variables to the comparator 20 match, that is to say if the instantaneous values of the nominal rotation speed $N_{nom}$ and of the modeled motor rotation speed of the model block 10 match, a signal STAT is set as the output from the comparison 20. In the exemplary embodiment explained here, the signal STAT is set from a value STAT=0 to a value STAT=1 if the input variables to the comparator 20 match.

The output value $I_{nom}$ from the regulator 1 has the mathematical sign removed from it via a magnitude-forming device 30 and is input, as an input variable, to a sample and hold register 40 which receives, as a further input variable, the signal STAT, by means of which it is controlled. When the signal changes from STAT=0 to STAT=1, the sample and hold register 40 stores the value of $I_{nom}$, with the mathematical sign removed from it, that is applied to its input at this time as a value $I_s$, and passes this to its output.

An adder 45 receives, as input variables, the value of $I_s$ which is stored at that time by the sample and hold register 40 and is applied to the output of the latter. Furthermore, the adder receives as an input a value $\Delta I$ which defines a permissible discrepancy for the value $I_{nom}$. This permissible discrepancy $\Delta I$ is preferably an upward discrepancy, so that the adder 45 obtains a maximum value $I_{max}$ by adding the sampled value $I_s$ to the discrepancy $\Delta I$, and supplies this as its output.

The output value $I_{max}$ from the adder 45 is compared by a further comparator 50 with the output value, from which the magnitude has been removed, of the present value of $I_{nom}$. If this instantaneous value, from which the magnitude has been removed, of $I_{nom}$ is greater than the maximum value $I_{max}$, an output signal from the comparator 50 changes from a value 0 to a value 1. This output signal from the comparator 50 and the signal STAT from the comparator 20 are input as input variables into an AND gate 60 which sets the signal LOCK at its output from a value 0 to a value 1 if both the signal STAT and the output signal from the comparator 50 have the value 1 at the same time.

Figure 4A:
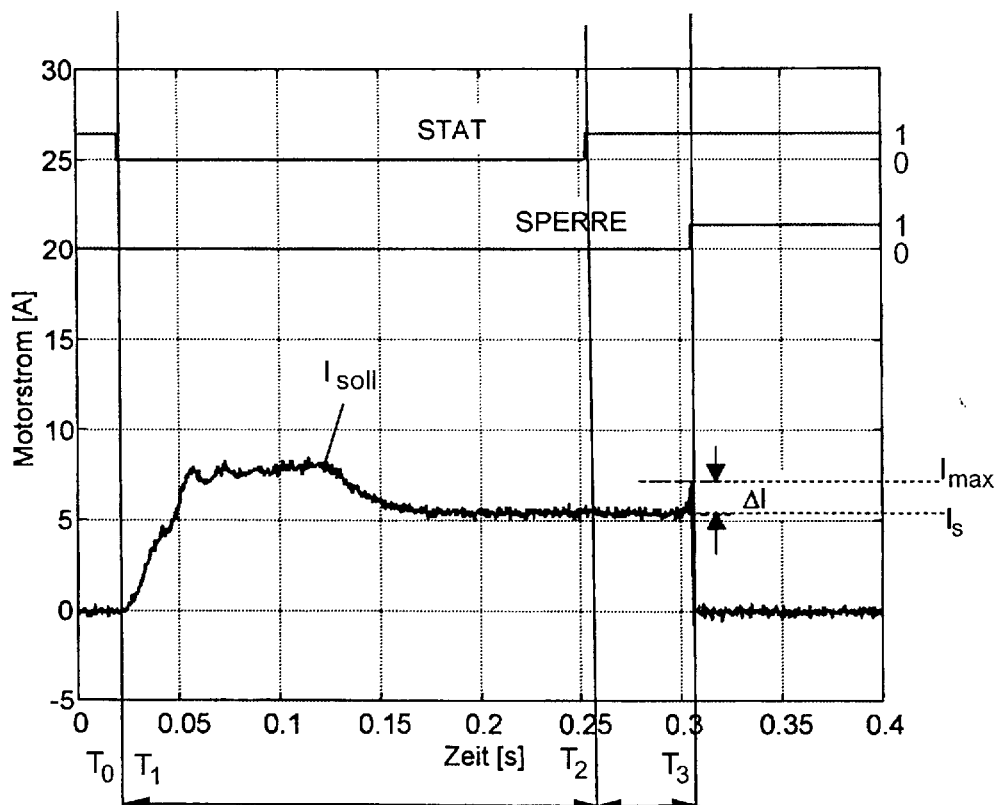
FIGS. 4 and 5 show an illustration of the method of operation of the decision-maker 5 with various loads.
Figure 4B:
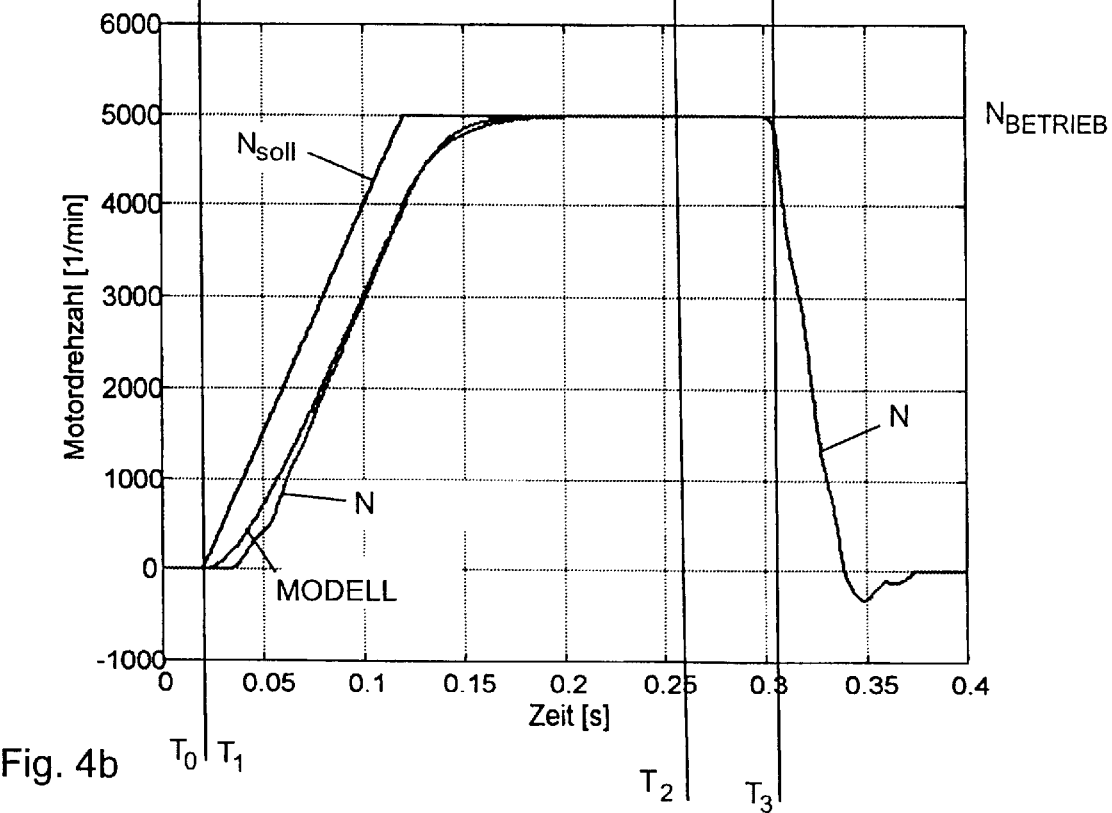

The method of operation of the decision-maker 5 can be seen from the graphs in FIGS. 4a and 4b, with both FIGS. 4a and 4b showing an example when the load on the actuator 3 from the load 4 is low. For this load example, FIG. 4a shows firstly the profile of $I_{nom}$ and the signals STAT and LOCK plotted against time. In a corresponding way, FIG. 4b shows the rotation speed profile for this example, with respect to time. In this case, FIG. 4b shows, firstly, the profile of the nominal rotation speed $N_{nom}$ and of the model curve MODEL produced in the model-forming device 10. To assist understanding, FIG. 4b also shows the actual profile of the actual value N of the rotation speed.

From the time $T_0$ (in this case: t=0) to a time $T_1$ (in this case, for example: t=0.02 s), the values of $N_{nom}$ and of the modeled curve MODEL match (both are equal to zero). In a corresponding way, the signal STAT is equal to 1 from $T_0$ to $T_1$. Since the value of $I_{nom}$ is approximately 0 from $T_0$ to the time $T_1$, the output signal from the comparator 50 is likewise 0 so that, overall, the signal LOCK is 0.

From the time $T_1$ until the time $T_2$, the values of $N_{nom}$ and of the model curve MODEL differ, so that the comparator 20 sets the signal STAT=0. In a corresponding way, the signal LOCK also remains 0.

At the time $T_2$, the rotation speed reaches an operating value $N_{OPERATION}$, and the nominal value curve $N_{nom}$ meets the modeled curve MODEL at this value $N_{OPERATION}$. Since the two values now match, the comparator 20 accordingly sets the signal STAT from 0 to 1. The value of $I_{nom}$, with the mathematical sign removed from it, in the sample and hold register 40 at this time $T_2$ is stored as $I_s$ in the sample and hold register 40, and is supplied to the adder 45. The adder 45 also adds the permissible discrepancy $\Delta I$ to this stored value $I_s$, and passes the sum on as its output $I_{max}$ to the input of the comparator 50.

From $T_2$ until the time $T_3$, the actual value $I_{nom}$ is less than the maximum value $I_{max}$, so that the output value from the comparator 50 remains 0 and, in a corresponding way, the output value from the AND gate 60 remains LOCK=0.

The magnitude of $I_{nom}$ does not exceed the value $I_{max}$ until the time $T_3$, so that the output from the comparator 50 changes from 0 to 1. Since the signal STAT is 1 at this time and both input signals to the AND gate 60 are thus one, the output signal LOCK from the AND gate 60 likewise has to change to 1. This signal LOCK=1 from the decision-maker 5 once again acts on the amplifier 2. On the basis of the signal LOCK=1, the amplifier 2 then sets the current value supplied to the actuator 3 to zero, so that the actuator 3 does not produce any torque, and the load 4 slowly brakes the actuator 3 to 0, as can be seen from FIG. 4b.

The decision-maker 5 therefore in each case stores as $I_s$ in the sample and hold register 40 that value of $I_{nom}$ which is actually present (with the mathematical sign removed from it) at the time $T_2$ when the operating value $N_{OPERATION}$ is reached, and in each case uses this together with the permissible discrepancy $\Delta I$ to monitor for the torque being exceeded after the time $T_2$. If the torque is then exceeded, the signal LOCK=1 is triggered, and the decision-maker 5 stops the actuator 3 via the amplifier 2.

Figure 5A:
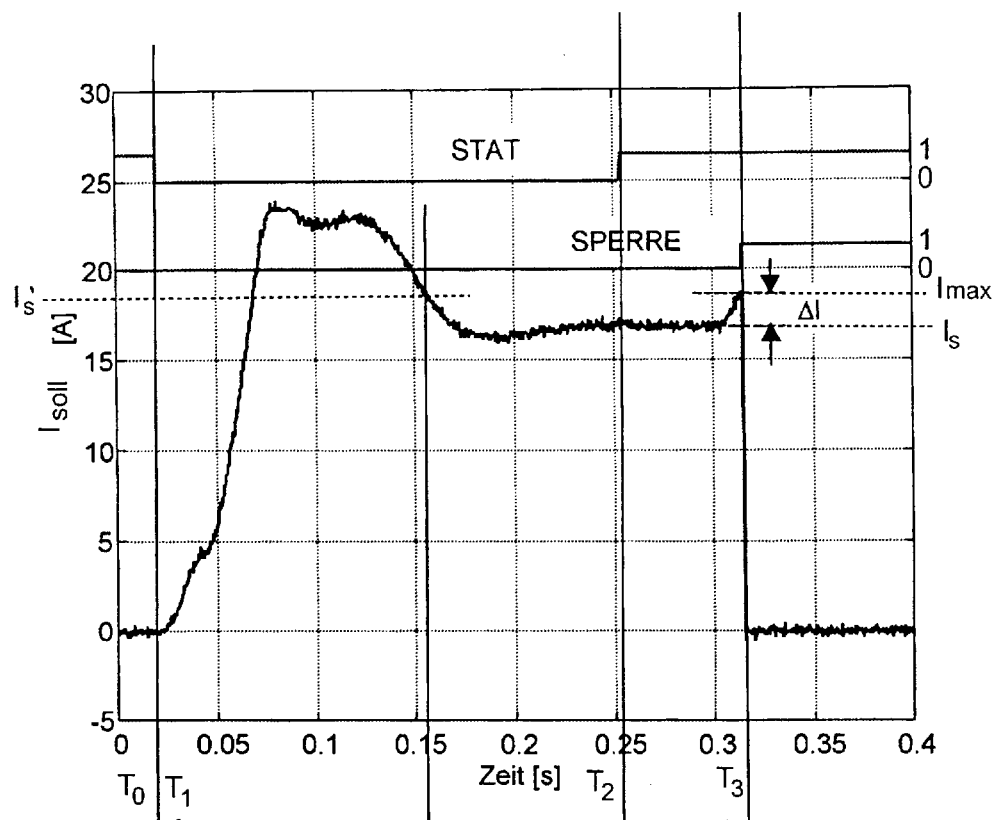
Figure 5B:
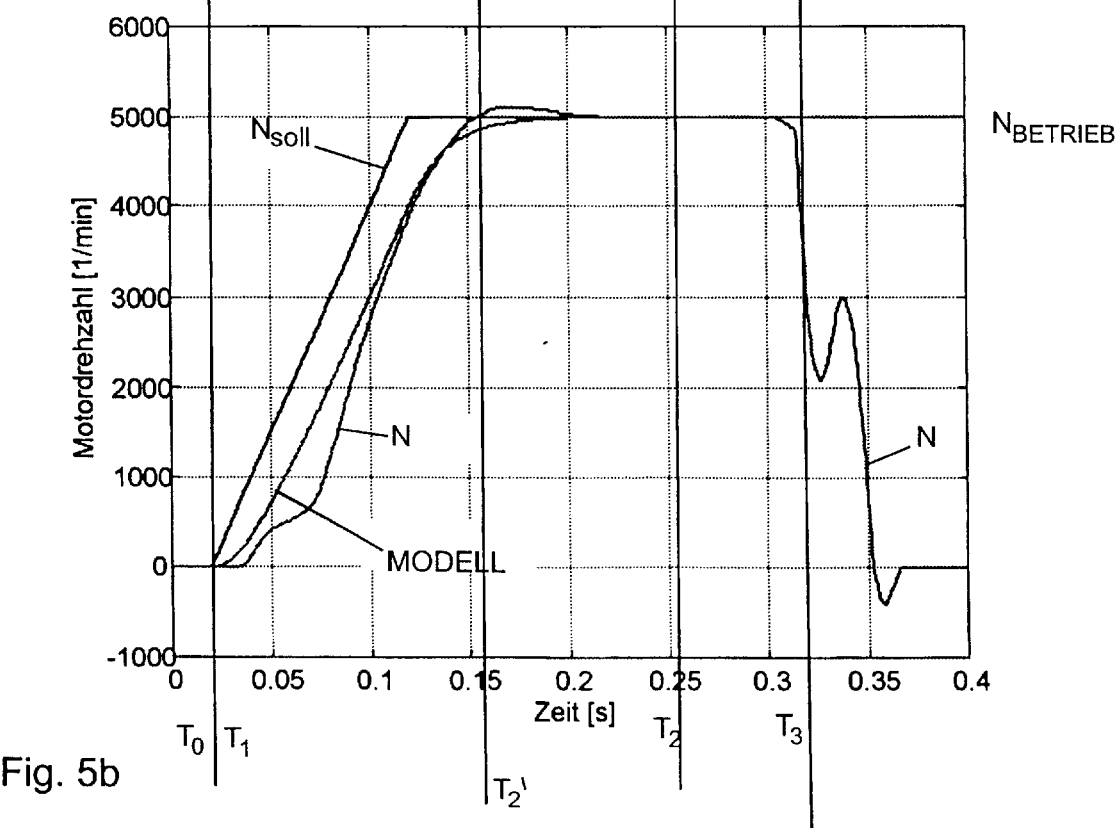

FIGS. 5a and 5b show a further example of a high load situation corresponding to the illustration in and description relating to FIGS. 4a and 4b, that is to say for the situation where the load 4 in the FIG. 5 is greater than that in the FIG. 4. This is particularly evident in the values for the current $I_{nom}$, which are considerably higher in FIG. 5a than in FIG. 4a. Since FIGS. 4 and 5 are intended to relate to the same exemplary embodiment, the profiles of $N_{nom}$ and MODEL in FIGS. 4 and 5 are the same, and accordingly also once again relate to the time $T_2$.

In a corresponding manner to that in the above statements relating to FIGS. 4a and 4b, the signal STAT changes from 1 to 0 at the time $T_1$, and remains at STAT=0 until the time $T_2$, at which the value of $N_{nom}$ once again matches the value on the MODEL curve. At this time $T_2$, the instantaneous value $I_{nom}$ is stored in the sample and hold register 40, with its magnitude removed, as $I_s$. If this value $I_s$ stored in the sample and hold register 40 is exceeded, added to the discrepancy $\Delta I$, at the time $T_3$, the signal LOCK is set from 0 to 1, and the amplifier 2 is switched to produce no torque.

It can be seen in particular from the differences between FIGS. 4a and 5a how the invention allows a lower or higher maximum current $I_{max}$ depending on the load situation, only beyond which is the actuator 3 switched to produce no torque. In consequence, the switching-off threshold is adaptively matched to the actual load conditions at the end of the acceleration process, when the operating rotation speed $N_{OPERATION}$ is reached. It is thus possible to identify whether there is any reason to switch off, essentially independently of the actual load state. The system must not be switched off if the operating states are permissible.

As can be seen from FIGS. 4 and 5, the operation of the control system illustrated in FIG. 2 can be subdivided into two load phases I and II. The first load phase I starts with the acceleration of the actuator 3 at the time $T_1$ from 0 to the desired rotation speed $N_{OPERATION}$. The load phase I ends at the time at which the operating rotation speed $N_{OPERATION}$ has been reached, and the acceleration process has thus been completed. This condition is satisfied at the time $T_2$.

The second load phase II therefore starts at the time $T_2$ and does not end again until the time $T_3$, when the value $I_{max}$ is exceeded.

Since it is also permissible for the value of $I_{nom}$ to be increased, without this being a reason for switching off, during acceleration to the operating rotation speed $N_{OPERATION}$ in the load phase I, fault identification is deactivated in this load phase I and the signal LOCK is set to 0. As soon as the operating rotation speed $N_{OPERATION}$ is reached in the load phase II, the identification of the presence of a reason for switching off if the maximum current value $I_{max}$ is exceeded can be activated, so that increased torques can be avoided. As can be seen from FIGS. 3–5, the decision-maker 5 requires, as input variables, only the nominal rotation speed value $N_{nom}$ and the output value $I_{nom}$ from the regulator 1, which corresponds to the torque, in order to determine the signal LOCK. Instead of the actual value of the rotation speed N, which is shown only for further information purposes in FIGS. 4b and 5b, the decision-maker 5 uses the modeled motor rotation speed characteristic MODEL for determining the sampled values $I_s$.

It is immediately evident that, in particular, the time $T_2$ at which the value of MODEL corresponds to the value of $N_{nom}$, can be influenced by the choice and the presetting of this modeled rotation speed characteristic MODEL. The duration of the load phase I can thus be shortened or lengthened by suitable design of the characteristic MODEL. In a further embodiment, the profile of the MODEL curve is in this case predetermined such that it can be adaptively matched to the respective situation rather than being static.

The use of the model profile MODEL instead of a comparison with the actual rotation speed N has the advantage that, if the model profile MODEL is preset in an appropriate manner, it can reliably be assumed that the system has reached a steady state of the operating rotation speed $N_{OPERATION}$, and instantaneous increases in the rotation speed (for example in the event of an overshoot) do not corrupt the value.

As can be seen, the time profile of the actual value N can likewise also be used instead of the model curve MODEL for the comparison by the comparator 20 with the nominal value $N_{nom}$. While this would not lead to any significant change in the duration of the load phase I in the profile at low load shown in FIG. 4b, in the high load case shown in FIG. 5b, the duration of the load phase I would be considerably shortened to the time between the time $T_1$ and a time $T_2'$ at which the values of $N_{nom}$ and N match. While, in a corresponding manner, this does not result in any change to the holding value of the current $I_s$ in the case shown in the FIG. 4, the resultant value $I_s'$ at the time $T_2'$ in the example in the FIG. 5 would be somewhat greater than the value $I_s$ at the time $T_2$.

When choosing the model characteristic MODEL, care must be taken, in particular, to ensure that this, at least in principle, corresponds to the actual profile of the actual value N. However, if, as is preferable, the overshoot actually occurs at high load (see FIG. 5b in the time period between 0.15 and 0.2 seconds), this should not be precipitated into the model characteristic MODEL, since the steady state has not yet occurred at this time. The profile of the model characteristic MODEL accordingly corresponds, in a suitable manner, more to the profile of the actual rotation speed N when the load is very low, and this was also the situation chosen in the cases in FIGS. 4b and 5b.

The defined discrepancy $\Delta I$ supplied to the adder 45 in FIG. 3 can either be preset as a fixed value or else can be adaptively matched, for example, to the conditions at that time. In the exemplary embodiments illustrated in FIGS. 3–5, it is only worthwhile monitoring an upward discrepancy so that the value of $\Delta I$ is added to the value of $I_s$ in order to determine the value $I_{max}$. In a corresponding manner, in applications in which it is intended to monitor a downward discrepancy of the torque in the same way or instead (for example in order to identify whether the load has been lost), the circuit can be adapted in an appropriate manner as shown in FIG. 3. However, this changes nothing with regard to the fundamental relationships.

As can be seen from the comparison of FIGS. 4 and 5 for the situations where the load differs, the invention allows the value of $I_s$ to be matched adaptively to the respective load conditions that are actually occurring during the load phase I. The torque profile of $I_{nom}$ can then be monitored for undesirable overshoots and/or undershoots with respect to these actual load conditions in the subsequent load phase II. In the exemplary embodiment of the application of the control system illustrated in FIG. 2 to a transport device (for example in aircraft), the area between $T_0$ and $T_1$ illustrated in FIGS. 4 and 5 corresponds to a loading phase in which the conveyor belt has packages placed on it while it is stationary. The actuator 3 is switched on at the time $T_1$, and accelerates in the load phase I to the motor operating rotation speed $N_{OPERATION}$. The load phase II following this is continued until the actuator 3 is either switched off manually or automatically when the conveyor belt reaches a desired position, or the signal LOCK signals a fault state. In the former case, the conveyor belt can then once again have items placed on it while it is stationary, so that the illustrated conditions recur successively. In the latter case of a malfunction, steps to rectify the malfunction can be initiated when such a malfunction is identified by the occurrence of the signal LOCK.

What is claimed is:

1. A monitoring unit (5) for monitoring a first control value ($I_{nom}$) for overshooting or undershooting of a threshold value ($I_{max}$), with the first control value ($I_{nom}$) being used for controlling an apparatus (3); having:
   determination means (10, 20, 30, 40, 45) for determining the threshold value ($I_{max}$) from an instantaneous value ($I_s$) of the first control value ($I_{nom}$) when the apparatus (3) reaches a predetermined operating state, and
   monitoring means (50, 60) for monitoring the first control value ($I_{nom}$) for overshooting or undershooting of the determined threshold value ($I_{max}$) after the apparatus (3) has reached the predetermined operating state.

2. The monitoring unit (5) as claimed in claim 1, wherein the determination means (10, 20, 30, 40, 45) has a first identification means (20) for monitoring an operating parameter ($N_{nom}$) of the apparatus (3) for identification of the predetermined operating state of the apparatus (3).

3. The monitoring unit (5) as claimed in claim 2, wherein the first identification means (20) has a comparator (20) for comparing a predetermined value ($N_{nom}$) of the operating parameter with a modeled value (MODEL) of the operating parameter, in which case, if the values match, it is deduced that the apparatus (3) has reached the predetermined operating state.

4. The monitoring unit (5) as claimed in claim 2, wherein the first identification means (20) has a comparator (20) for comparing a predetermined value ($N_{nom}$) of the operating parameter with an actual value (N) of the operating parameter, in which case, if the values match, it is deduced that the apparatus (3) has reached the predetermined operating state.

5. The monitoring unit (5) as claimed in claim 1, wherein the determination means (10, 20, 30, 40, 45) has a memory means (40) for storing the instantaneous value ($I_s$), or a value derived from it, of the first control value ($I_{nom}$) at the time when the apparatus (3) reaches the predetermined operating state.

6. The monitoring unit (5) as claimed in claim 1, wherein the determination means (10, 20, 30, 40, 45) has a definition means (45) for defining the threshold value ($I_{max}$) from the instantaneous value ($I_s$) of the first control value ($I_{nom}$) when the apparatus (3) reaches the predetermined operating state, and preferably from a permissible discrepancy ($\Delta I$).

7. The monitoring unit (5) as claimed in claim 2, wherein the monitoring means (50, 60) has a second identification means (50) for identifying whether the first control value ($I_{nom}$), or a value derived from it, is greater than or less than the determined threshold value ($I_{max}$).

8. The monitoring unit (5) as claimed in claim 7, wherein the monitoring means (50, 60) has a third identification means (60) for identifying whether the first control value ($I_{nom}$) is greater than or less than the determined threshold value ($I_{max}$) and whether the apparatus (3) is in the predetermined operating state.

9. The monitoring unit (5) as claimed in claim 8, wherein, when the apparatus (3) is in the predetermined operating state, the third identification means (60) sets a warning signal (LOCK) for the apparatus (3) when the determined threshold value ($I_{max}$) is overshot or undershot.

10. A control system for an actuator (3), having:
    a regulator (1) which receives, as input variables, a nominal value ($N_{nom}$) of an operating parameter for the actuator (3), and an actual value (N) of the operating parameter from the actuator (3), and which supplies, as its output, a first control value ($I_{nom}$) for the actuator (3),
    characterized by a monitoring unit (5) for monitoring the first control value ($I_{nom}$) for overshooting or undershooting of a threshold value ($I_{max}$), in which case the monitoring unit (5) has:
    determination means (10, 20, 30, 40, 45) for determining the threshold value ($I_{max}$) from an instantaneous value ($I_s$) of the first control value ($I_{nom}$) on reaching a predetermined operating state, and
    monitoring means (50, 60) for monitoring the first control value ($I_{nom}$) for overshooting or undershooting of the determined threshold value ($I_{max}$) after the actuator (3) has reached the predetermined operating state,
    in which case the determination means (10, 20, 30, 40, 45) has a first identification means (20) for monitoring the nominal value ($N_{nom}$) of the operating parameter of the actuator (3) for identification of the predetermined operating state of the actuator (3), and if the first control value ($I_{nom}$) overshoots or undershoots the determined threshold value ($I_{max}$), the monitoring unit (5) locks the actuator (3) (LOCK) when said actuator (3) reaches the predetermined operating state.

11. A transport device, preferably in an aircraft, having an actuator (3) and a control system as claimed in claim 10.

* * * * *